Patented Feb. 22, 1949

2,462,602

UNITED STATES PATENT OFFICE 2,462,602

PREPARATION OF VINYL ETHERS

Donald G. Botteron, Syracuse, N. Y., assignor to Pittsburgh Plate Glass Company, Allegheny County, Pa., a corporation of Pennsylvania No Drawing. Application September 7, 1946, Serial No. 695,547

4 Claims. (Cl. 260—614)

The present invention relates to the preparation of vinyl ethers and more particularly to the preparation of mixed vinyl lower-alkyl ethers.

One object of the invention is to provide a novel process for the preparation of mixed vinyl lower-alkyl ethers.

A further object of my invention is to provide a simplified process for the preparation of mixed vinyl lower-alkyl ethers.

Other objects and advantages of the invention will become more apparent from the following detailed description of certain preferred embodiments thereof.

The mixed vinyl ethers are relatively well known compounds of importance as polymerizable materials. Heretofore, they have been prepared from aliphatic acetals or by the direct addition of acetylene to alcohols. A more recent process involves the dehydrochlorination of alpha-chlorinated alkyl ethers with a strong alkali in the presence of a strongly basic amine.

Briefly stated, the present invention contemplates the formation of mixed vinyl lower-alkyl ethers by the dehydrohalogenation of 1-haloethyl lower-alkyl ether.

The reaction may be carried out most advantageously with 1-chloroethyl lower-alkyl ethers, although the use of other halogen ethers is possible. The 1-chloroethyl lower-alkyl ethers are readily prepared by the reaction of acetaldehyde with a lower-alkyl alcohol and hydrogen chloride.

The dehydrohalogenation of 1-haloethers is accomplished by the reaction therewith of pyridine. Presumably other bases related to pyridine, such as picoline or quinoline, would function similarly but attempts to use such amines, as dibutylamine, dimethylaniline, and other primary and secondary amines, were not successful. Furthermore, although the 1-haloalkyl ethers are more active than the 2-haloalkyl ethers, dehydrohalogenation thereof to the vinyl ethers is not possible using solid sodium hydroxide or potassium hydroxide, which reagents will bring about the dehydrohalogenation of the 2-haloalkyl ethers.

The following examples will adequately illustrate the nature of this invention, but the invention is not restricted to these examples.

Example I

Ethyl 1-chloroethyl ether (25 parts by weight) was added slowly to pyridine (40 parts by weight) contained within a suitable reaction vessel with sufficient cooling to prevent evolution of any volatile material duing the course of the reaction. Thereafter the reaction mixture was subjected to fractional distillation to a maximum temperature of 100° C. at atmospheric pressure. The fraction boiling from 35-37° C. was collected and identified as vinyl ethyl ether. The higher boiling reaction products and the residue were not identified.

Example II

Two hundred and twenty parts by weight of pyridine were placed in a reaction vessel provided with suitable heating means and fitted with a dropping funnel and a fractionating column. Two hundred and eighteen parts by weight of 1-chloroethyl isopropyl ether were added slowly to the pyridine. The reaction was exothermic in nature and the products thereof were removed continuously through the fractionating column during the addition of the ether. Distillation was continued until the vapor temperature reached 82° C. at atmospheric pressure. The fraction boiling from 52 to 56° C. was collected and identified as vinyl isopropyl ether.

Example III

The process of Example II was repeated using 1-chloroethyl isobutyl ether. A fraction boiling from 88 to 94° C. was collected and identified as vinyl isobutyl ether.

It will be obvious that many different embodiments of this invention are possible without departing from the spirit of the invention or the scope of the appended claims.

I claim:

1. A process of preparing a mixed vinyl lower-alkyl ether which comprises admixing the corresponding 1-chloroethyl lower-alkyl ether with pyridine and heating the mixture.

2. A process of preparing vinyl ethyl ether which comprises admixing 1-chloroethyl ethyl ether with pyridine and heating the mixture to distill therefrom the desired vinyl ethyl ether.

3. A process of preparing vinyl isopropyl ether which comprises admixing 1-chloroethyl isopropyl ether with pyridine and heating the mixture to distill therefrom the desired vinyl isopropyl ether.

4. A process of preparing vinyl isobutyl ether which comprises admixing 1-chloroethyl isobutyl ether with pyridine and heating the mixture to distill therefrom the desired vinyl isobutyl ether.

DONALD G. BOTTERON.

REFERENCES CITED

The following references are of record in the file of this patent:

UNITED STATES PATENTS

| Number | Name | Date |
| --- | --- | --- |
| 2,021,872 | Major et al. | Nov. 19, 1935 |
| 2,326,373 | Long | Aug. 10, 1933 |

OTHER REFERENCES

Neher et al., "Journal American Chemical Society," vol. 48, pages 2416 to 2425 (1926).

Godefroy, "Comptes Rendus," vol. 102, pages 869 to 872 (1886).